US008661367B2

(12) United States Patent
Woo

(10) Patent No.: US 8,661,367 B2

(45) Date of Patent: Feb. 25, 2014

(54) PROVIDING ACCESS TO PARTS OF CONTENTS FOR NETWORK DISPLAY DEVICE

(75) Inventor: Nayoung Woo, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 242 days.

(21) Appl. No.: 12/938,943

(22) Filed: Nov. 3, 2010

(65) Prior Publication Data

US 2011/0107218 A1 May 5, 2011

(30) Foreign Application Priority Data

Nov. 4, 2009 (KR) ........................ 10-2009-0106165
Nov. 10, 2009 (KR) ........................ 10-2009-0108031

(51) Int. Cl.
*G06F 3/048* (2013.01)

(52) U.S. Cl.
USPC ........... 715/810; 715/733; 715/738; 715/716; 715/719; 715/205; 725/37

(58) Field of Classification Search
USPC ......... 715/716, 719, 723, 733, 738, 764, 765, 715/810, 205, 234; 725/8, 37, 86, 87
See application file for complete search history.

(56) References Cited

U.S. PATENT DOCUMENTS 5,818,510 A * 10/1998 Cobbley et al. ............... 725/139
6,961,954 B1 * 11/2005 Maybury et al. ................ 725/53
7,313,808 B1 * 12/2007 Gupta et al. .................... 725/89
7,756,758 B2 * 7/2010 Johnson et al. .............. 705/26.1
7,933,329 B2 * 4/2011 Venna et al. ............. 375/240.11
2002/0053078 A1 * 5/2002 Holtz et al. ..................... 725/14
2004/0199657 A1 * 10/2004 Eyal et al. ...................... 709/231
2006/0123347 A1 * 6/2006 Hewitt et al. ................. 715/748
2008/0168359 A1 * 7/2008 Flick et al. .................... 715/748
2009/0094159 A1 * 4/2009 Cunningham et al. .......... 705/51
2010/0158470 A1 * 6/2010 Tzoukermann et al. ........ 386/46
2010/0306058 A1 * 12/2010 Johnson et al. ............ 705/14.55
2011/0107235 A1 * 5/2011 Woo .............................. 715/748
2012/0084665 A1 * 4/2012 Bookstaff ..................... 715/748

FOREIGN PATENT DOCUMENTS

EP 1 873 966 A1 1/2008
WO WO 02/102079 A1 12/2002
WO WO 02102079 A1 * 12/2002 ............. H04N 7/173

* cited by examiner

*Primary Examiner* — Xiomar L Bautista

(74) *Attorney, Agent, or Firm* — Birch, Stewart, Kolasch & Birch, LLP

(57) ABSTRACT

Provided is to a method of providing a part of content over network in which a user accesses a content provider server over a network, and selects and downloads only a part of content or receives information for accessing the part of content, or generates access information for the part of content and stores the access information in the content provider server, thereby enabling to easily access the part of content when accessing later. In the method, a user may access a plurality of parts configuring content instead of a content unit.

18 Claims, 23 Drawing Sheets

Fig. 13

| CONTENT NAME | CONTENT ID | CONTENT LINK | REPLAYED TIME | STORED DATE |
|---|---|---|---|---|
| A | 0001 | http://serviceprovider.net/service/A | 1:00 | Feb. 10. 2010 |
| B | 0002 | http://serviceprovider.net/service/B | 1:30 | Feb. 20. 2010 |
| C | 0003 | http://serviceprovider.net/service/C | 2:00 | Feb. 25. 2010 |
| ⋮ | ⋮ | ⋮ | ⋮ | ⋮ |

PROVIDING ACCESS TO PARTS OF CONTENTS FOR NETWORK DISPLAY DEVICE

CROSS-REFERENCE TO RELATED APPLICATIONS

The present application claims the benefit of priority under 35 U.S.C. 119 to Korean Patent Application No. 10-2009-0106165 filed on Nov. 04, 2009 and No. 10-2009-0108031 filed on Nov. 10, 2009 which are hereby incorporated by reference in its entirety.

BACKDATEGROUND

The present disclosure relates to a method of providing a part of content over network, and more particularly, to a method in which a user accesses a content provider server over a network, and selects and downloads only a part of content or receives information for accessing the part of content, or generates access information for the part of content and stores the access information in the content provider server, thereby enabling to easily access the part of content when accessing later. According to embodiments, a user may access a plurality of parts configuring content instead of a content unit.

As a digital-based digital television (TV) technology is developed instead of analog broadcasting and is practically applied, various kinds of content services such as real-time broadcasting, Contents On Demand (COD), games and news may be provided to users by using the Internet network connected to each home besides broadcasting medium.

As an example of providing the content services over the Internet network, there are Internet Protocol TVs (IPTVs). The IPTVs transmit all kinds of information services, video contents and broadcasting to provide them to users' TVs over the high-speed Internet network.

As a type of TV that has been further advanced by one stage than the IPTVs, recently, concepts such as broadband TVs, web TVs and smart TVs have been proposed. In such TVs, a plurality of content providers exist unlike the IPTVs, and users may individually access the plurality of content provider to receive contents, which are provided from the content providers, such as various Video On Demand (VOD), games and video telephone services.

Users should download selected contents for viewing desired contents, and it was impossible to access a part of the selected content.

Therefore, since the users should access total videos even when they desire to view only a portion of videos, the users should pay undesired costs for payment contents, much time is taken for downloading, and there is inefficiency because it is impossible to view only a necessary part.

SUMMARY

Embodiments provide a method, which can segment one content and directly access a part of the content to a user in a network TV system.

In one embodiment, a method of segmenting and accessing content in a display device accessible to a network includes: accessing a content provider server; receiving a content selection input from a user; receiving a selection input for a section of the selected content from the user; transmitting information of the selected section to the content provider server; and receiving data associated with the selected section from the content provider server.

In another embodiment, a method of segmenting and providing content in a server providing contents over a network includes: transmitting contents-related information to a user terminal; receiving content selection information from the user terminal; receiving selection for a section of the selected content from the user terminal; and generating link information for the selected section.

In further another embodiment, a method of segmenting and accessing content in a display device accessible to a network includes: receiving and replaying content; receiving a storage command of the replayed content from a user; transmitting scene information up to a time, which is backdated by a certain time from a currently-replayed scene of the replayed content, to a content provider server; and receiving link information for accessing a part corresponding to the scene information from the content provider server, and storing the link information.

In still further another embodiment, a method of segmenting and providing content in a server providing contents over a network includes: receiving a storage request to currently-replayed content from a user terminal; receiving scene information of the content from the user terminal; and generating link information for accessing a part corresponding to the scene information.

In even further another embodiment, a video signal processing apparatus accessible to a network includes: a user input unit receiving a content selection input from a user and a selection input for a section of the selected content; a network interface accessing a content provider server, and receiving content or data associated with a section of the content which is selected by the user according to a user input; and a controller transmitting the content selection input and the selection input for a section of the content to the content provider server, and providing the data associated with the section selected by the user to the user.

In yet further another embodiment, a video signal processing apparatus accessible to a network includes: a user input unit receiving a storage command of currently-replayed content from a user; a network interface transmitting the storage command to a content provider server, and receiving data associated with the content from the content provider server; and a controller transmitting scene information up to a scene, which is backdated by a certain time from a currently-replayed scene of the replayed content, to the content provider server, and receiving link information for accessing a part corresponding to the scene information from the content provider server to store the link information, when the storage command is received.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is an exemplary diagram illustrating a data structure where a link for a part of content is stored in a network TV, according to an embodiment;

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, the image sensor and a method for manufacturing the same according to the present invention will be described with reference to the accompanying drawings in detail.

Figure 1:
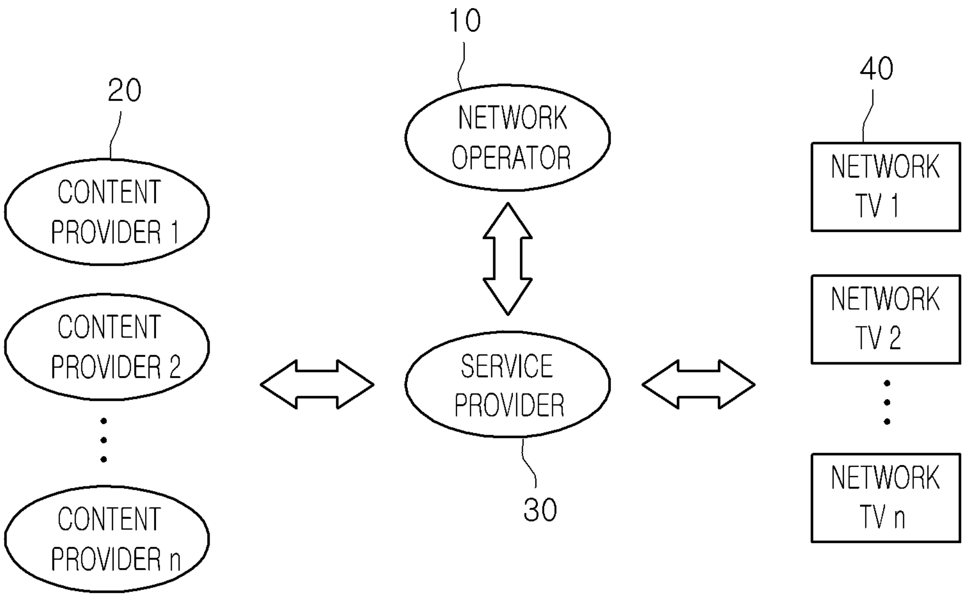
FIG. 1 is a block diagram illustrating a network of a network TV system according to an embodiment.

FIG. 1 is a block diagram illustrating a network of a network TV system according to an embodiment.

Referring to FIG. 1, a network TV system according to an embodiment includes a network operator server 10, at least one Content Provider (CP) server 20, a service provider 30, and at least one network TV 40.

The network operator server 10 provides base software necessary for normally operating contents, which are provided from the content provider server 20 to the network TV 40, in the network TV 40. Also, the network operator server 10 may provide the hardware information of the network TV 40 necessary for normally executing contents in the network TV 40, to the content provider server 20.

For example, the network operator server 10 provides a main screen configured when contents provided by content providers are displayed on the network TV 40, and when a user selects content or inputs various commands, the network operator server 10 provides a user interface for displaying an output based on the selected content or the commands. Also, the user interface provides information for updating the firmware or software of the network TV 40 whenever necessary. The network operator server 10 may be the same main agent as the manufacturer of the network TV 40.

The content provider server 20 creates various contents, which may be provided on a network, to configure the contents into a format capable of replay in the network TV 40, and provides the contents according to the request of the network TV 40. The contents may be arbitrary data that may be serviced over the network.

The service provider 30 may be an Internet service provider that provides network communication between the network operator server 10, the content provider server 20 and the network TV 40. The network may include an arbitrary wired/wireless Internet network using an Internet protocol. Particularly, the service provider 30 transmits contents provided by the content provider server 20 to the network TV 40, performs the maintenance and management of a transmission network in order for a user to stably receive the contents, and provides base facilities for transmission of the contents to the content provider server 20.

The network TV 40 receives contents through the service provider 30 to replay or execute the contents in response to a user's command. The network TV 40 includes broadcasting reception devices such as a network set-top box, and a user terminal, being an arbitrary video signal processing device, on which a network interface and a phone for network are mounted.

More specifically, the content provider server 20 may a provider that creates all kinds of contents to be provided to the network TV 40. The content provider server 20 may include a TV broadcasting station, a radio broadcasting station, a VOD provider, an Audio On Demand (AOD) provider, a game provider, a picture phone service provider, a weather information provider and a photograph-related service provider.

The service provider 30 serves as a medium that transmits the data and command of the network operator server 10, the data and command of the content provider server 20 and the data and command of the network TV 40. The service provider 30 may be a common wired/wireless Internet service provider. The service provider 30 provides communication network hardware in order for the network operator serve 10, content provider server 20 and network TV 40 to smoothly communicate with each other, and simultaneously provides various communication services such as IP address assignment and bandwidth control. The function of the service provider 30 has been well known, and thus its more detailed description will be omitted.

The network TV 40, as described above, includes broadcasting reception devices such as a network set-top box on which an Internet communication module is mounted, and arbitrary devices such as a network phone.

The network TV 40 fundamentally has a network interface accessible to a network. The network TV 40 receives the assignment of an IP address, and receives a data packet over a network to process the data packet. When the data packet is multimedia data such as video and audio, the network TV 40 may store or replay the multimedia data.

The network TV 40 may transmit a user's requirements while processing multimedia data through bi-directional communication. Also, buttons for controlling the network TV 40, i.e., buttons for selecting various menus may provide to a remote controller for controlling the network TV 40 in order for the network TV 40 to well use services.

Figure 2:
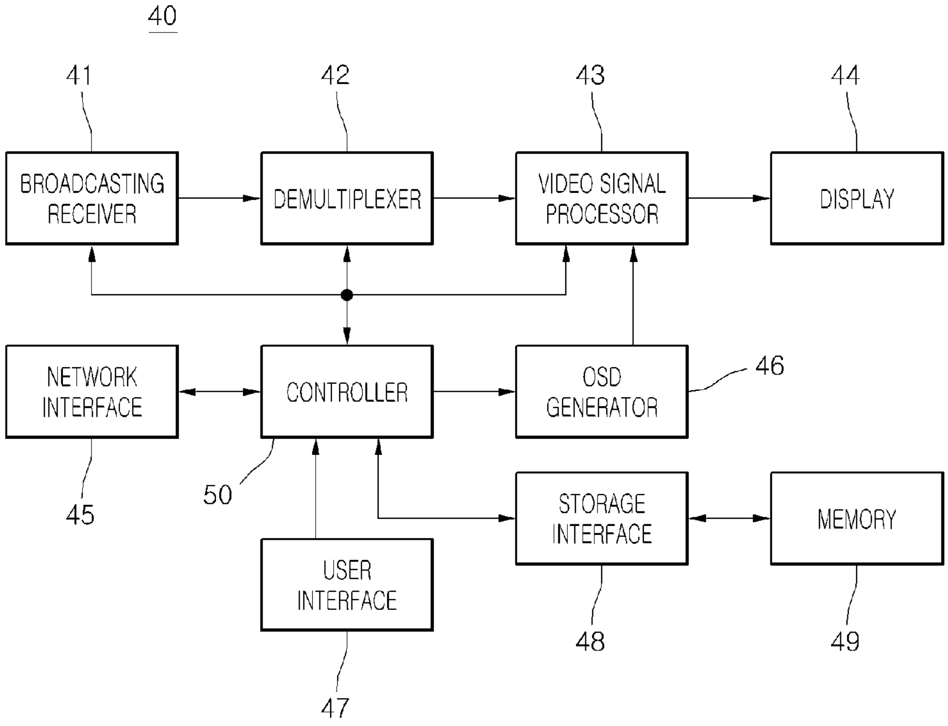
FIG. 2 is a block diagram illustrating a configuration of a network TV according to an embodiment.

Hereinafter, the above-described configuration and operation of the network TV 40 will be described in detail. FIG. 2 is a block diagram illustrating a configuration of the network TV 40 according to an embodiment.

The network TV 40 may additionally have a function that receives a broadcasting signal being a Radio Frequency (RF) signal wirelessly or through a cable with a broadcasting receiver 41, besides a function of receiving contents over a network.

The network TV 40 according to an embodiment, as described above, includes the broadcasting receiver 41, a demultiplexer 42, a video signal processor 43, a display 44, a network interface 45, an On Screen Display (OSD) generator 46, an user interface 47, a storage interface 48, a memory 49, and a controller 50.

Among such elements, the broadcasting receiver 41, the demultiplexer 42 and the video signal processor 43 may configure one broadcasting processor that receives a broadcasting signal and changes the broadcasting signal to a signal capable of being outputted to the display 44 through various processing.

When contents are digital broadcasting, a digital broadcasting signal is transmitted as a packetized transport stream into which a video signal, an audio signal and additional data are time-division multiplexed.

The broadcasting receiver 41 may include an antenna receiving a broadcasting signal that is transmitted from the outside. Also, the broadcasting receiver 41 may include a tuner that tunes a broadcasting signal having a frequency band corresponding to a tuning control signal according to the tuning control signal of the controller 50 that will be described below, and a demodulator that outputs the broadcasting signal of a tuned specific channel as a transport stream through a Vestigial Sideband (VS) demodulating operation and an error correcting operation.

Video data segmented through the demultiplexer 42 is processed by the video signal processor 43 and displayed on the display 44.

In this case, the video signal processor 43 includes an MPEG-2 decoder, and a scaler that changes the video data to be suitable for a vertical frequency, a resolution and a screen rate that accord with the output standard of the display 44.

Herein, the display 44 may selectively use various types of display devices such as Digital Light Processing (DLP), Liquid Crystal Display (LCD) and Plasma Display Panel (PDP).

Furthermore, an audio signal is processed by an audio signal processor (not shown) and outputted to a speaker, in which case the audio signal processor may include an AC-3 decoder.

Additional data included in additional data that is segmented through the demultiplexer 42 is stored in the memory 49 through the storage interface 48 that will be described below.

The memory 49 may be implemented with an Electrically Erasable Programmable Read-Only Memory (EEPROM).

As a means for receiving a requirement command from a user, the user interface 47 includes an infrared receiver that receives an infrared signal inputted through a remote controller, or a local key input unit disposed at the one side of a panel.

The network interface 45 receives contents or data from the content provider server 20 or the network operator server 10 over a network. That is, the network interface 45 receives contents, which are provided from a content provider over the network, such as broadcasting, a game, VOD and a broadcasting signal and information associated with the contents. Also, the network interface 45 receives the update information and update file of a firmware the network operator sever 10 provides through the network interface 45.

The OSD generator 46 generates a main screen for receiving a user's determination signal in an OSD type.

That is, the OSD generator 46 may display information related to contents, which are received through the network interface 45, through the display 44.

The controller 50 controls an overall operation based on a command that is inputted from the user interface 47.

The controller 50 receives the software (i.e., the update file of a firmware) of the content provider server 20 received from the network operator server 10.

Figure 3:
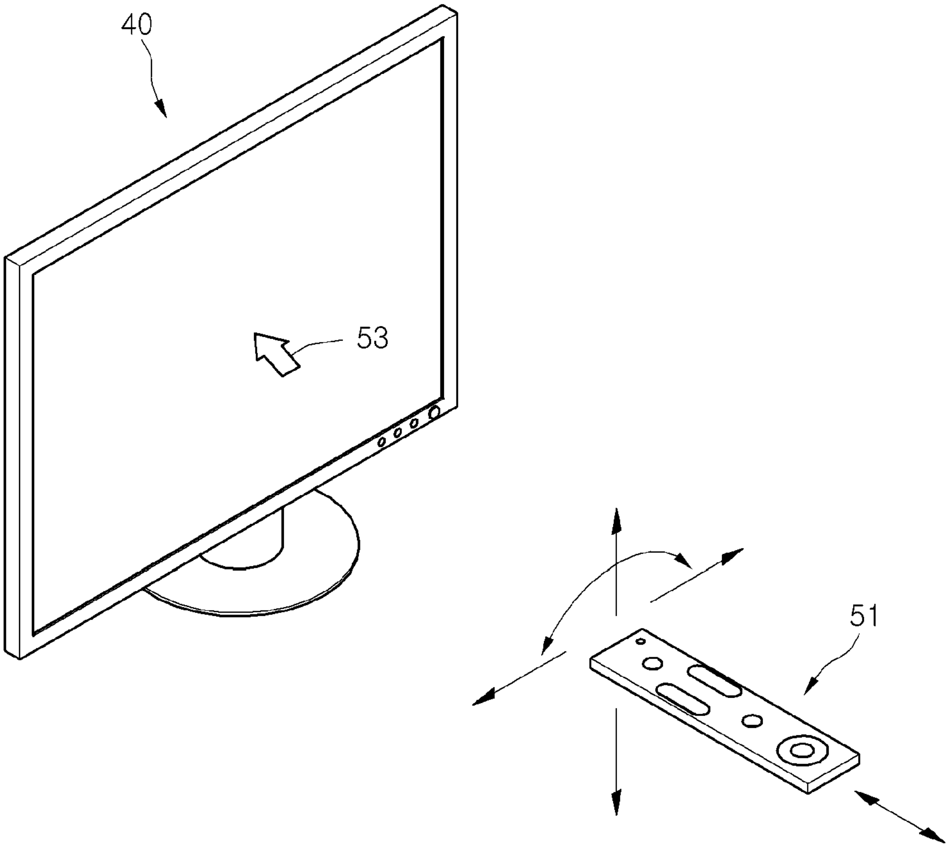
FIGS. 3 and 4 are exemplary diagrams illustrating a use example of a remote controller for controlling the network TV of FIG. 2.
Figure 4:
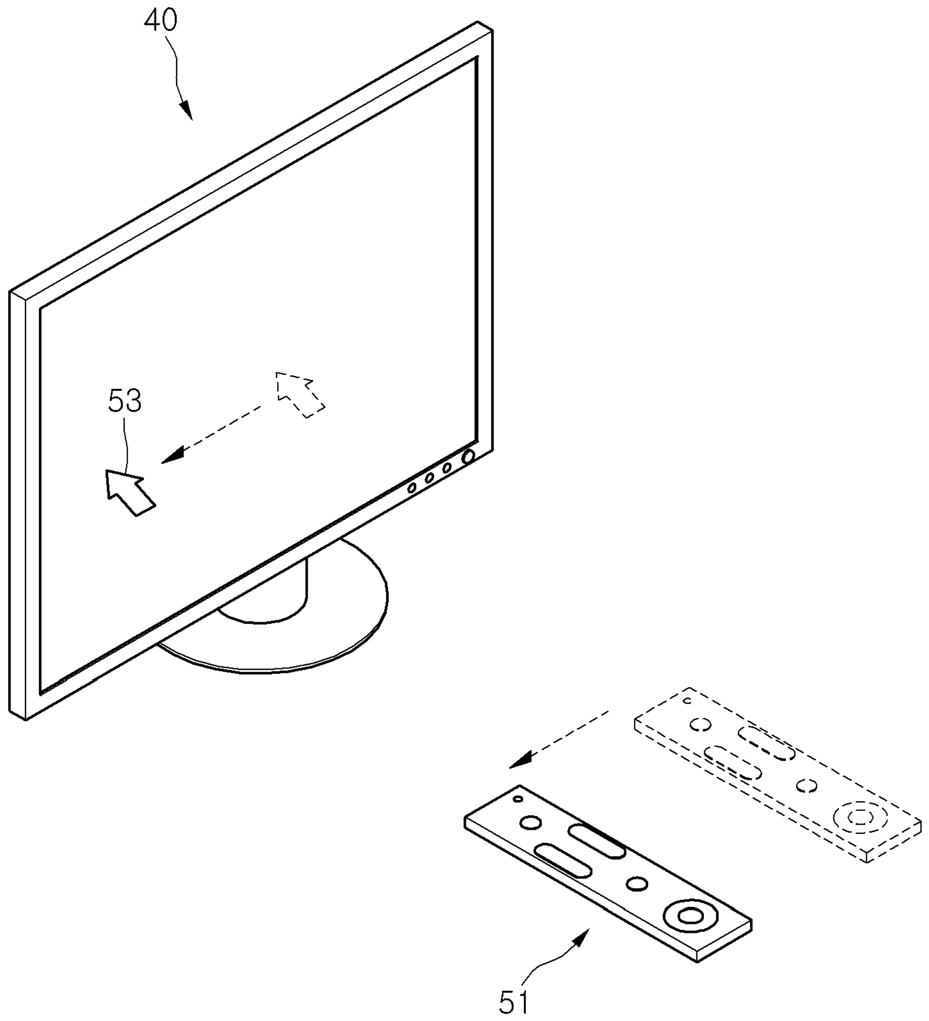

FIGS. 3 and 4 are exemplary diagrams illustrating a use example of a remote controller for controlling the network TV of FIG. 2.

Figure 5:
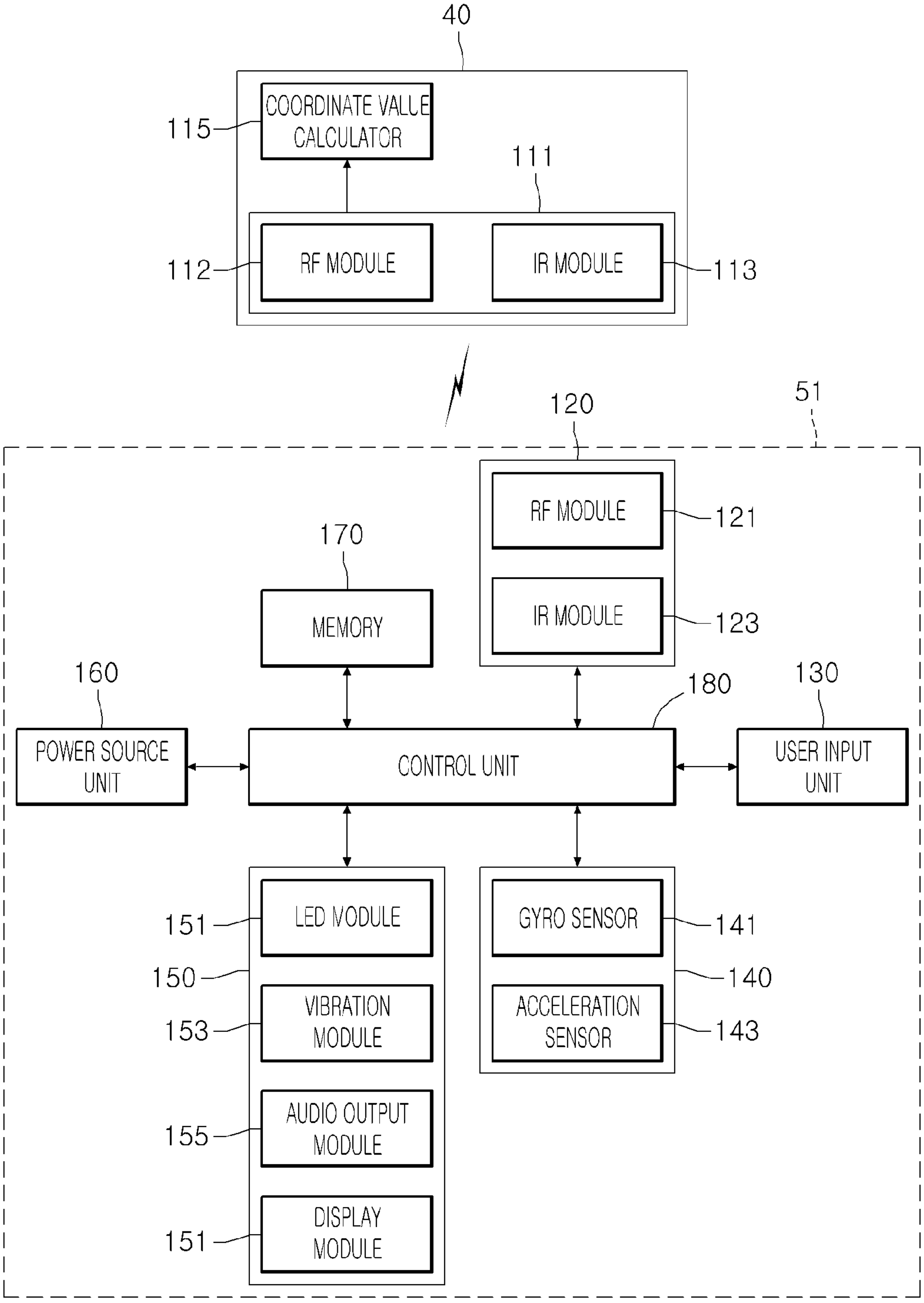
FIG. 5 is a block diagram illustrating an internal configuration of a user interface in a network TV of FIG. 1 and an internal configuration of a motion recognition remote controller in FIG. 3.

A remote controller may transmit a control signal to the controller 50 through a wireless signal receiver of receiving wireless a signal such as an RF signal or an infrared signal, wherein the wireless signal receiver may be included in the user interface 47 of the network TV 40. The remote controller that will be described below with reference to FIGS. 3, 4 and 5 is one that reacts to a user's motion as well as the button input of the user, and it is referred to as a motion recognition remote controller 51.

In an embodiment, the motion recognition remote controller 51 may transmit/receive signals to/from the network TV 40 according to an RF communication protocol. As illustrated in FIG. 3, in the network TV 40, a pointer 53 may be displayed at a location the motion recognition remote controller 51 points.

The user may move the motion recognition remote controller 51 upward and downward, right and left, backward and forward or rotate the motion recognition remote controller 51. A pointer 53 displayed in the network TV 40 responds to the motion of the motion recognition remote controller 51. FIG. 4 illustrates a bar where a pointer displayed in the network TV 40 moves in response to the motion of the motion recognition remote controller 51.

As illustrated in FIG. 3, when the user moves the motion recognition remote controller 51 to the left, even a pointer displayed in the network TV 40 moves to the left in response to the motion of the motion recognition remote controller 51. In an embodiment, the motion recognition remote controller 51 may include a sensor for determining a motion. The motion Information of the motion recognition remote controller 51 sensed by the sensor is transmitted to the network TV 40. The network TV 40 determines the motion of the motion recognition remote controller 51 on the basis of the motion information of the motion recognition remote controller 51, and calculates the coordinate values of the pointer 53 corresponding to the motion.

An acceleration sensor, a Gyro sensor or a geomagnetic sensor may be used as a sensor for determining a motion.

FIGS. 3 and 4 illustrate examples in which the pointer 53 displayed in the display 49 moves in response to the vertical motion, horizontal motion or rotation of the motion recognition remote controller 51. The moving speed or moving direction of the pointer 53 may correspond to the moving speed or moving direction of the motion recognition remote controller 51.

In an embodiment, setting is made in order for a pointer displayed in the network TV 40 to move in response to the motion of the motion recognition remote controller 51. As another example, a configuration is made in order for a certain command to be inputted to the network TV 40 in response to the motion of the motion recognition remote controller 51. That is, when the motion recognition remote controller 51 moves backward and forward, the size of an image displayed in the network TV 40 may be magnified or reduced.

FIG. 5 is a block diagram illustrating an internal configuration of the user interface 47 in the network TV 40 of FIG. 1 and an internal configuration of the motion recognition remote controller 51 in FIG. 3.

Referring to FIG. 5, the network TV 40 may include a coordinate value calculator 115, and a wireless communicator 111. The coordinate value calculator 115 may be included in the controller 50. The wireless communicator 111 may be included in the user interface 47. The wireless communicator 111 may include an RF module 112 or an infrared (IR) module 113.

The motion recognition remote controller 51 may include a wireless communication unit 120, a user input unit 130, a sensor unit 140, an output unit 150, a power source unit 160, a memory 170, and a control unit 180.

The wireless communication unit 120 transmits/receives signals to/from the network TV 40. In an embodiment, the motion recognition remote controller 51 may include an RF module 121 that transmits/receives signals to/from the user interface 47 of the network TV 40 according to an RF communication protocol. Also, the motion recognition remote controller 51 may include an IR module 123 that transmits/receives signals to/from the user interface 47 of the network TV 40 according to an IR communication protocol.

In an embodiment, the motion recognition remote controller 51 transmits a signal including the motion information of the motion recognition remote controller 51 to the network TV 40 through the RF module 121. Also, the motion recognition remote controller 51 may receive a signal transmitted from the network TV 40 through the RF module 121. Moreover, the motion recognition remote controller 51 may transmit commands such as turn-on/off of a power source, channel switch and volume change to the network TV 40 through the IR module 123, depending on the case.

The user input unit 130 may include a keypad or buttons. A user may input a command related to the network TV 40 with the motion recognition remote controller 51 by manipulating the user input unit 130. When the user input unit 130 includes a hard key button, the user may input the command related to the network TV 40 with the motion recognition remote controller 51 by pushing the hard key button. When the user input unit 130 includes a touch screen, the user may input the command related to the network TV 40 with the motion recognition remote controller 51 by touching the soft key of the touch screen. Also, the user input unit 130 may include various kinds of input means such as scroll key and a jog key for the user manipulating, but an embodiment is not limited thereto.

The sensor unit 140 may include a Gyro sensor 141 or an acceleration sensor 143 as a motion sensor. The Gyro sensor 141 may detect the motion of the motion recognition remote controller 51. As an example, the Gyro sensor 141 may sense the motion information of the motion recognition remote controller 51 with respect to x, y and z axes. The acceleration sensor 141 may sense information of the moving speed of the motion recognition remote controller 51. The output unit 150 may output a video signal or an audio signal corresponding to the manipulation of the user input unit 130 or a signal transmitted by the network TV 40. The user may recognize the manipulation of the user input unit 130 or the control of the network TV 40 through the output unit 150.

As an example, the output unit 151 may include a Light Emitting Diode (LED) module 151, a vibration module 153, an audio output module 155, and a display module 157. Herein, when the user input unit 130 is manipulated or a signal is transmitted/received to/from the network TV 40 through the wireless communication unit 120, the LED module 151 emits light, the vibration module 153 vibrates, the audio output module 155 outputs audio, and the display module 157 outputs a video.

The power source unit 160 supplies a power source to the motion recognition remote controller 51. The power source unit 160 stops the supply of the power source when the motion recognition remote controller 51 does not move for a certain time, thereby reducing the waste of the power source. The power source unit 160 may again start the supply of the power source when a specific key included in the motion recognition remote controller 51 is manipulated.

The memory 170 may store various kinds of application data necessary for the control and operation of the motion recognition remote controller 51. When the motion recognition remote controller 51 wirelessly transmits/receives signals to/from the network TV 40 through the RF module 121, the motion recognition remote controller 51 and the network TV 40 transmits/receives a signal over a certain frequency band. The control unit 180 of the motion recognition remote controller 51 may store the information of a frequency band, over which the control unit 180 may wirelessly transmits/receives signals to/from the network TV 40 paired with the motion recognition remote controller 51, in the memory 170 and reference the information.

The controller 180 controls functions associated with the control of the motion recognition remote controller 51. The controller 180 may transmit a signal corresponding to the manipulation of a specific key of the user input unit 130 or a signal corresponding to the operation of the motion recognition remote controller 51 sensed by the sensor unit 140 to the wireless communicator 111 of the network TV 40 through the wireless communication unit 120.

As described above, the network TV 40 may include the wireless communication unit 120 that wirelessly transmits/receives signals to/from the motion recognition remote controller 51, and the coordinate value calculator 115 that calculates the coordinate values of a pointer corresponding to the operation of the motion recognition remote controller 51.

The wireless communicator 111 may wirelessly transmit/receive a signal to/from the remote controller 51 through the RF module 112. Also, the motion recognition remote controller 51 receives a signal, which is transmitted from the motion recognition remote controller 51 according to an IR communication protocol, through the RF module 112.

The coordinate value calculator 115 may correct shaking of a hand or an error from a signal corresponding to the operation of the motion recognition remote controller 51 that is received through the wireless communicator 111 and calculate the coordinate values (x,y) of the pointer 53 to be displayed in the display 49.

Moreover, the transmission signal of the motion recognition remote controller 51 that is inputted to the network TV 40 through the user interface 47 is transmitted to the controller 50 of the network TV 40. The controller 47 may determine information on the operation and key manipulation of the motion recognition remote controller 51 on the basis of a signal transmitted by the motion recognition remote controller 51, and control the network TV 40 in response to the determined information.

Hereinafter, a method will be described which selectively download a part of one content in the network TV system according to an embodiment.

Figure 6:
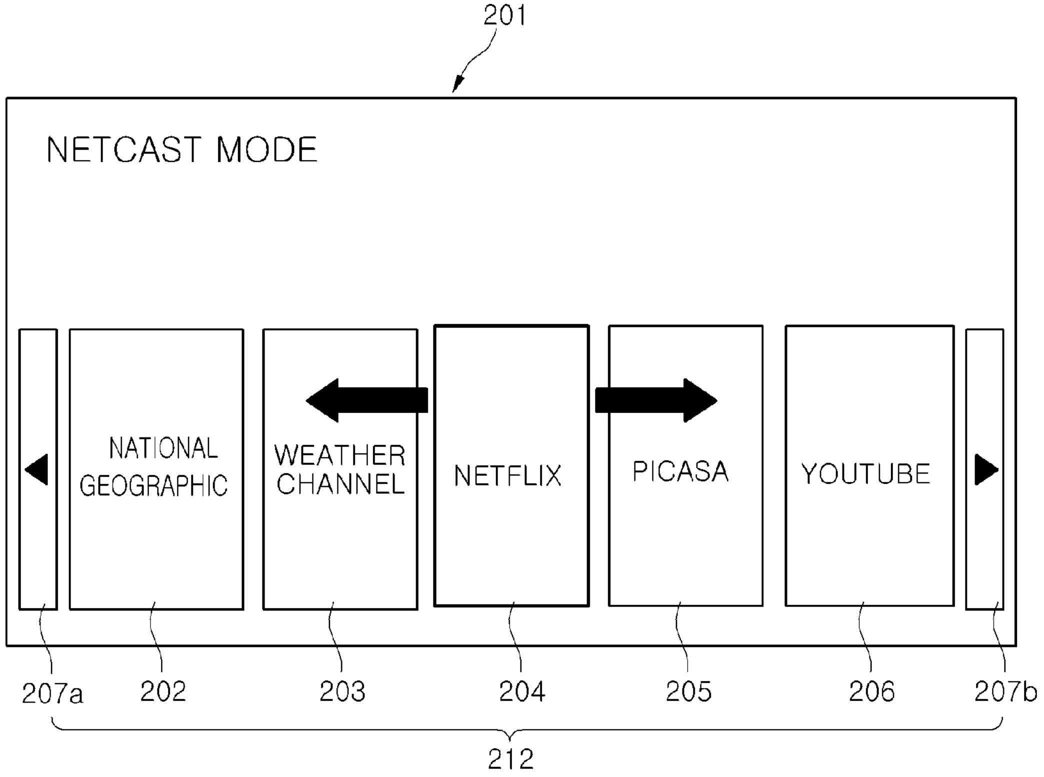
FIG. 6 is an exemplary diagram illustrating a main screen of a network TV according to an embodiment.

FIG. 6 is an exemplary diagram illustrating an initial screen or a main screen when selecting one of a plurality of content providers and executing an operation mode (hereinafter referred to as a NetCast mode) which provides a menu to be accessible, according to an embodiment. A main screen 201 may include a plurality of menu buttons 212 indicating content providers. A user may select one of the menu buttons 212 to access the server of each of the content providers and receive contents. The main menu merely is in accordance with an embodiment, and the network TV system according to an embodiment may be applied to an arbitrary type of network TV and content providing system that may access a content provider server to receive contents.

In the main screen 201, the user may select a desired content provider by using the direction key of the remote controller or the motion recognition remote controller 51. When there are many content providers, the user may view additional content providers with scroll buttons 207*a* and 207*b*.

In FIG. 6, as examples of content providers, the menu buttons of a National Geographic 202, a weather channel 203, a NetFlix 204, a Picasa 205 and a YouTube 205 are displayed.

The National Geographic 202 is a content provider that provides contents associated with natural science. The weather channel 203 is a content provider that provides weather information. The NetFlix 204 provides movie-related contents. The Picasa 205 is a content provider that provides photograph-related contents. The YouTube 206 is a content provider that provides VOD-related contents.

Figure 7:
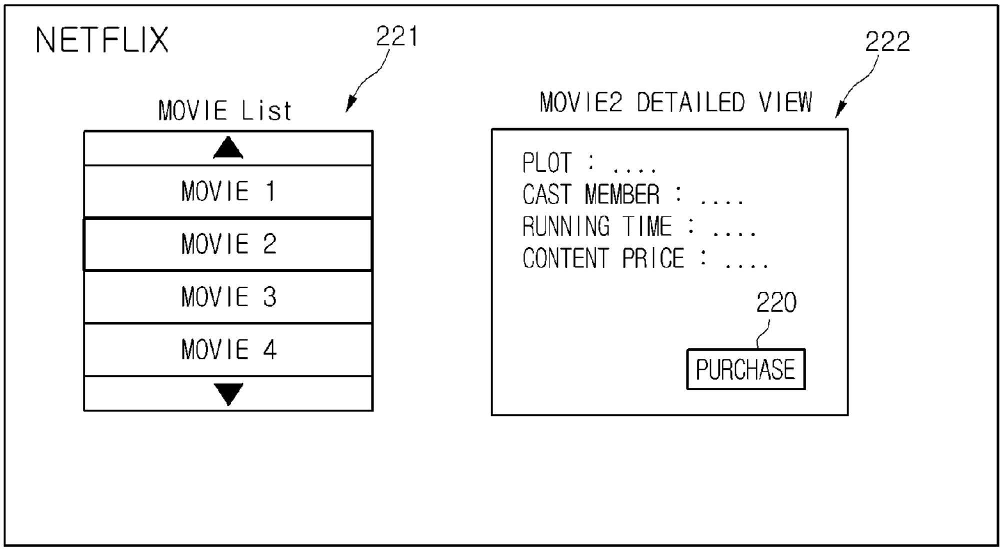
FIG. 7 is an exemplary diagram illustrating an initial screen of a content provider server according to an embodiment.

When the user selects and accesses the NetFlix 204 that provides movie contents, as illustrated in FIG. 7, the initial access screen of a NetFlix server is displayed.

Referring to FIG. 7, the initial screen of a movie content provider such as NetFlix includes a movie list 221 usable, and the user may move contents therebetween with the direction key of the remote controller or the motion recognition remote controller. The detailed information of content (for example, MOVIE2) selected by the user among the list 221 may be displayed on the other side of a screen. For example, information on the plot, cast member, running time and content price of the MOVIE2 selected by the user may be displayed. In the case of free content, information indicating free of charge may be included.

Figure 8:
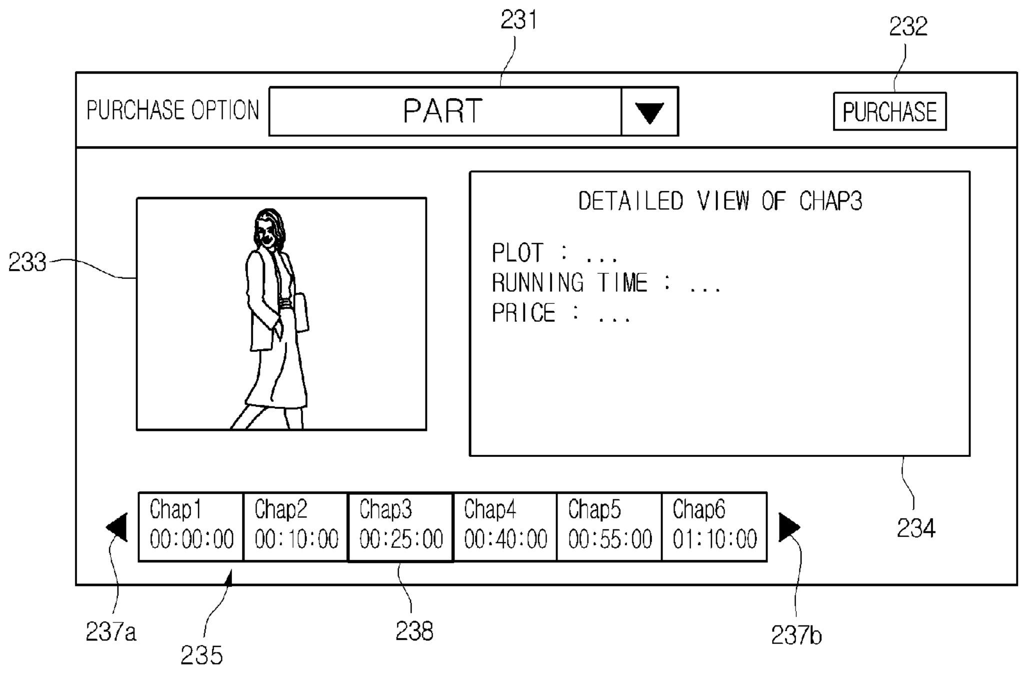
FIG. 8 is an exemplary diagram illustrating a purchase option menu according to an embodiment.

According to an embodiment, when the user decides the purchase of contents and selects the purchase button 220, as illustrated in FIG. 8, a purchase option button is displayed.

The user may select whether to purchase entire content or only a part of content through the purchase option menu. Also, the user may receive the detailed information of each part of the content.

As illustrated in FIG. 8, the user may select a part or entirety of content through a menu 231. Also, a preview screen 233 for selected content may be provided on the purchase option screen, and the section information 235 of entire content may be provided. The content section information 235 may include the partial names of contents, for example, chapters 1, 2, 3, . . . and the start time or running time of each section. When section information cannot be displayed on one screen, the user may view other sections with the scroll bars 237*a* and 237*b*.

When the user selects one section 238 from the section information 235, the detailed information 234 of the selected section may be provided. The detailed information 234 of the section may include the plot content description, running time and/or price of a section to download. When content is not a movie, detailed information may be changed based on the feature of each content.

The user may receive the content of a section including a desired video on the basis of detailed information by sections.

According to embodiments, a user may select a plurality of sections to purchase contents.

According to an embodiment, contents provided by a content provider are edited in advance so that they may be segmented into sections and provided, and even information on each section may be provided independently of information of entire content.

Segmenting the sections of contents may be changed according to embodiments. Furthermore, the sections of contents may be segmented by certain time units, and they may be segmented by contents and provided.

In a state where the section 238 has been selected, by selecting the purchase button 232, the user may download or stream a corresponding section. The user may download an actual file and receive contents in a streaming type. In the case of payment contents, payment is performed, but in the case of free contents, download or streaming may be immediately performed.

According to embodiments, the user may select a plurality of sections of contents that may be segmented in plurality and purchased, and may purchase the contents.

For accessing a part of contents, as described above, a content provider server may segment and edit content in advance, but the user may set a section to access among the content.

Figure 9:
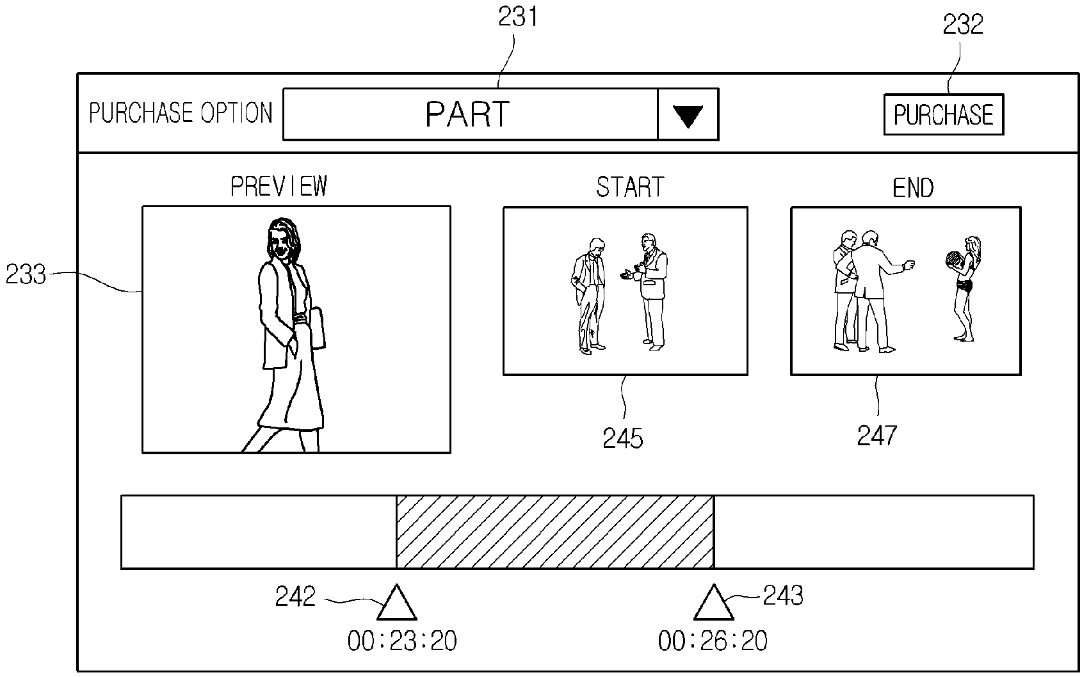
FIG. 9 is an exemplary diagram illustrating a method where a user sets a section to access among one content, according to an embodiment.

FIG. 9 is an exemplary diagram illustrating a method where a user sets a section to access among one content, according to an embodiment.

Referring to FIG. 9, when a user selects a purchase option 231 of content, a progressive bar 241 for the content may be displayed. The user may move arrows 242 and 243 of the progressive bar 241 with a remote controller to set a section for accessing. The arrow 242 indicates the start point of the section to access, and the arrow 243 indicates the end point of the section to access. According to an embodiment, a thumbnail 245 corresponding to a start point designated by the user and a thumbnail 247 corresponding to an end point designated by the user may be displayed. Also, the user may provide a preview 233 for the set section. When the user executes the preview 233, an image for a section that has been set in the preview 233 may be replayed.

The user may set a section to access through an interface having another type other than the progressive bar 241. For example, the user may input the start time and end time of a section to access.

The user sets a section, and when the user selects the purchase button 232, the selected section of content may be downloaded or received as streaming.

According to an embodiment, the user may set a section of content that is being replayed while replaying the content, and may download or stream the section.

Figure 10:
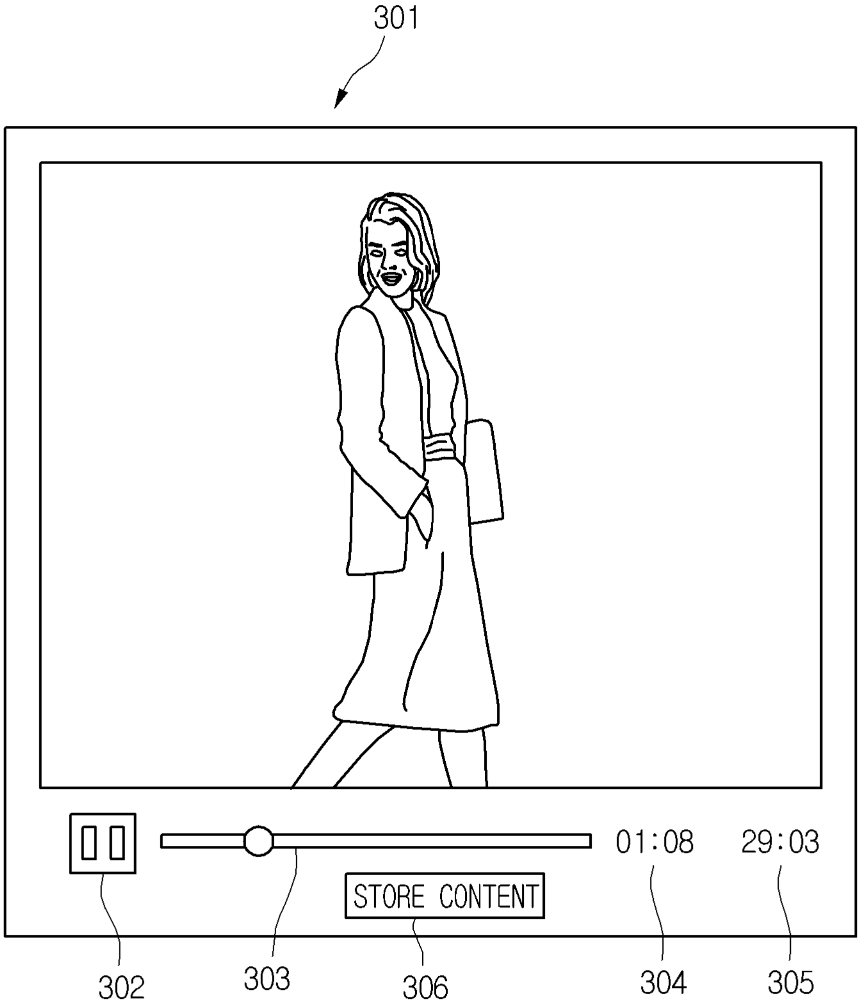
FIGS. 10 and 11 are exemplary diagrams illustrating a method of selecting a section of content while replaying content, according to an embodiment.

Referring to FIG. 10, it is assumed that content is being replayed through the network TV. Various function buttons, for example, a pause button 302, a progressive bar 303 and information (for example, elapse time 304 and remaining time 305).

Figure 11:
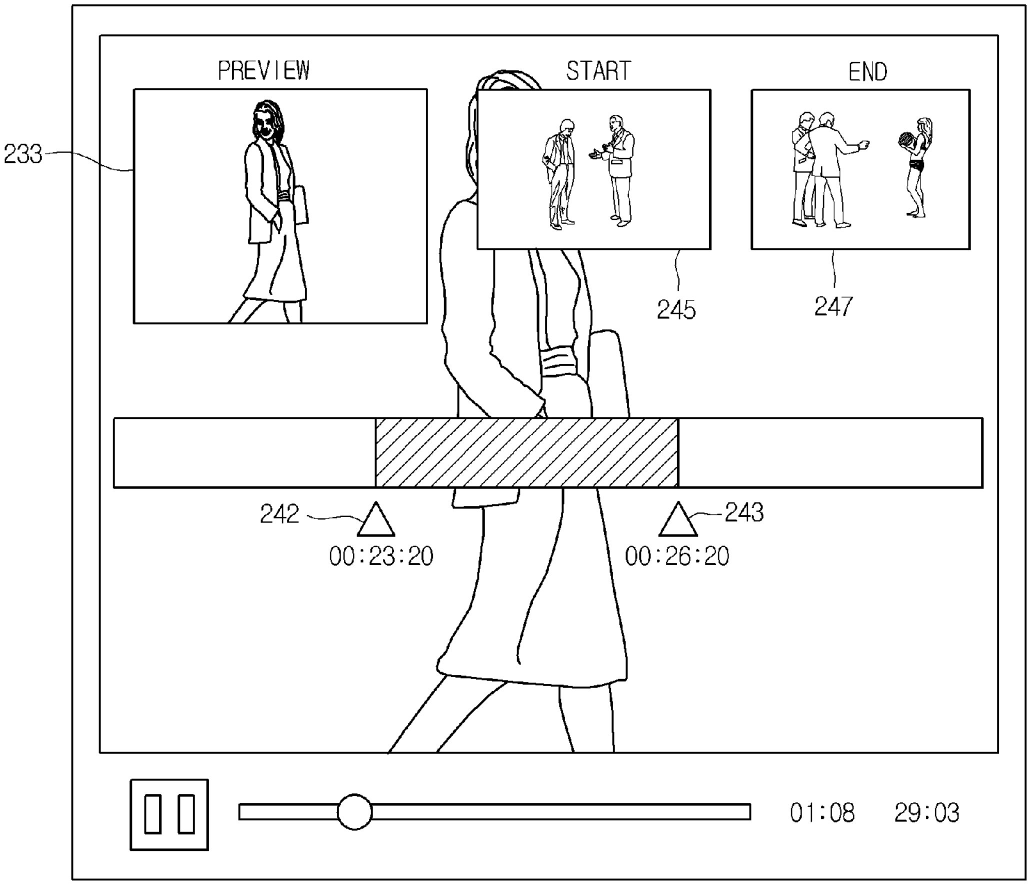

When the user selects a content storage button 306, as illustrated in FIG. 11, a section setting menu similar to FIG. 9 may be displayed. A replay screen 301 may be paused and thereby may not be displayed, and as illustrated in FIG. 11, it may be translucently displayed under a section designation screen.

When a section is designated through a menu of FIG. 11, and only the designated section may be downloaded or streamed.

Figure 12:
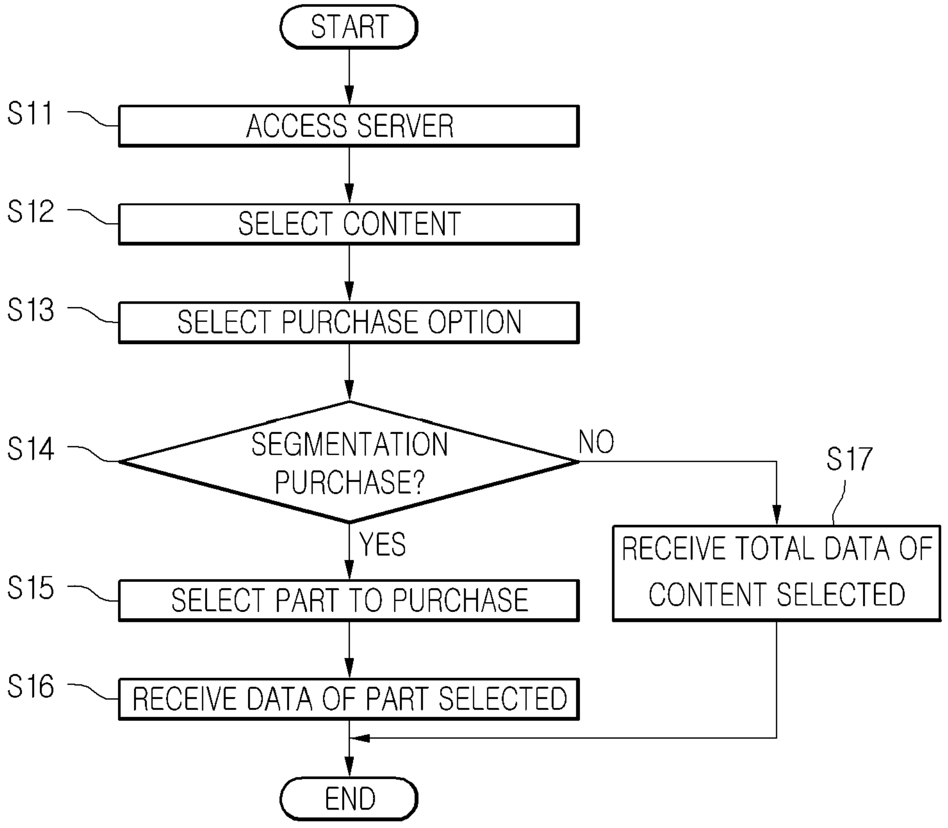
FIG. 12 is a flowchart illustrating a method of segmenting and providing content according to an embodiment.

FIG. 12 is a flowchart illustrating a method of segmenting and providing content according to an embodiment.

Referring to FIG. 12, the network TV 40 accesses the content provider server 20 in operation S11, and a user may select one or more of contents the content provider server 20 provides in operation S12. The user selects a download option, i.e., whether to download entire content selected or only a part of the selected content in operation S13.

When the user selects a segmentation purchase option in operation S14, and the user may select a part to purchase in operation S15. At this point, as described above with reference to FIG. 8, a section to download may be edited beforehand in the content provider server 20 and provided, and the user may directly set a section through the menu in FIG. 9 or 11.

Data of a part or a section that is selected by the user in content is downloaded or received as streaming in operation S16.

When a purchase option selected by the user is not a segmentation purchase, the entirety of selected content is downloaded or received as streaming in operation S17.

According to an embodiment, performing of segmentation purchase may be set as a default. In this case, in FIG. 12, operations S13 and S14 where the user selects the purchase option may be omitted.

According to an embodiment, a user may receive access information for a part of each of contents that are provided by the content provider server 20, for example, link information such as URL information for a section of content. The link information may be used when the user again accesses a part of the content later, and enables the user to directly access a pre-selected part of content without again accessing entire content. Also, the link information may be used for the user sharing with another user. When transmitting the link information to another user by e-mail, text message or other schemes, the other user may directly access a part of content on the basis of the link information.

Link information may be generated by the content provider server 20, and may be generated by a user terminal such as the network TV 40. Alternatively, when the network operator server 10 exists separately, the link information may be generated by the network operator server 10.

According to embodiments that have been described above with reference to FIGS. 8 to 11, when the user selects a section of content, link information for the selected section may be generated. The generated link information may be stored in the network TV 40.

FIG. 13 illustrates a state where link information on a section of content is stored in the network TV 40 when a user accesses the content provider server 20 through the network TV 40 and selects the section, according to an embodiment.

A content name indicates the title of content. Content identifier (ID) may be ID for distinguishing with other contents or broadcasting programs. For example, Content Reference ID (CRID) may be used as content ID. In FIG. 11, the content ID of A content is 0001, the content ID of B content is 0002, and content ID of C content is 0003. Content link is link information for accessing the selected section of each content. A replay time indicates the running time of a selected section, and a stored date indicates a date when link information is generated and stored.

Link information on a section of content may be stored in a user terminal such as a network TV, but it may be stored in the content provider server 20. When the link information is stored in the content provider server 20, the content provider server 20 may notify the network TV 40 that the link information has been stored in the network TV 40.

When link information is stored in the content provider server 20 and a user accesses the content provider server 20, the content provider server 20 may provide lists of link information, which are stored up to date, to the user through the network TV 40. The user may directly access a section of each content by using the link information lists provided.

Figure 14:
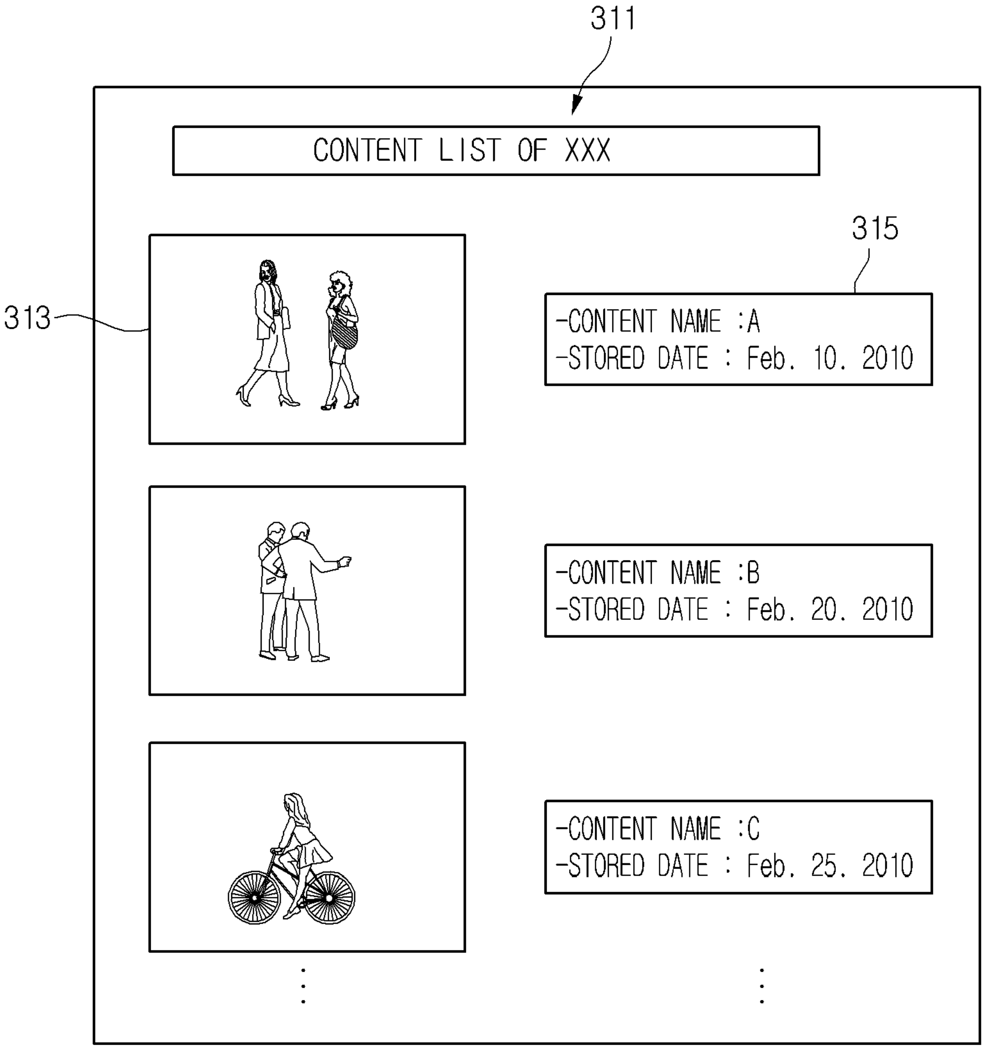
FIG. 14 is an exemplary diagram showing a link list when a link for a part of content is stored in a content provider server, according to an embodiment.

When link information is stored in the content provider server 20, as shown in FIG. 14, a link information list for a section of content a specific user selects may be provided. When the user accesses the content provider server 20 and inputs personal ID and password (PW), the user may view a link information list that has been generated by it.

A user name or ID 301 may be displayed in a content list. Also, a representative image or a thumbnail 303 and detailed information 305 for a part of each stored content may be included. The detailed information may include a content name and a stored date.

Figure 15:
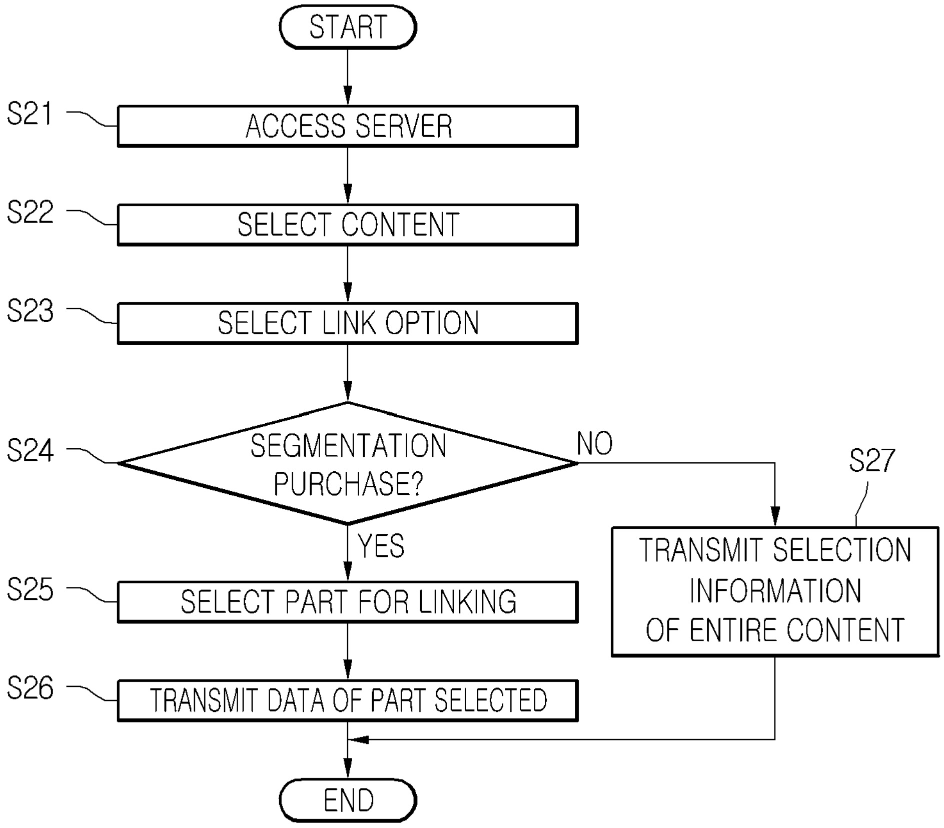
FIG. 15 is a flowchart illustrating a method of being performed in a user terminal, i.e., the network TV, among a method where a user generates link information on a section of specific content, according to an embodiment.

FIG. 15 is a flowchart illustrating a method of being performed in a user terminal, i.e., the network TV 40, among a method where a user generates link information on a section of specific content, according to an embodiment.

A user accesses the content provider server 20 through the network TV 40 in operation S21. The network TV 40 receives a content selection input from the user and selects one of contents provided from the content provider server 20 in operation S22. The network TV 40 receives a link option, i.e., whether to generate a link only for a part of content or a link for entire content, from the user in operation S23.

When the user inputs selection for generating a segmentation link, i.e., a link for a part of content in operation S24, the network TV 40 receives selection of a part to link from the user in operation S25. At this point, the user may select a part of content in one of the methods that have been described above with reference to FIGS. 8, 9 and 11.

The network TV 40 transmits information on whether to select any part of content to the content provider server 20 in operation S26. The content provider server 20 generates a link for a part the user selects, and may transmit link information to the network TV 40 or may store the link information in it.

When the user inputs selection for generating a link for entire content in operation S24, the network TV 40 transmits information indicating that entire content has been selected to the content provider server 20 in operation S27. The content provider server 20 generates a link for accessing entire content, and may transmit link information to the network TV 40 or may store the link information in it.

According to an embodiment, performing of segmentation link may be set as a default. In this case, in FIG. 15, operations S23 and S24 where the user selects the link option may be omitted.

Figure 16:
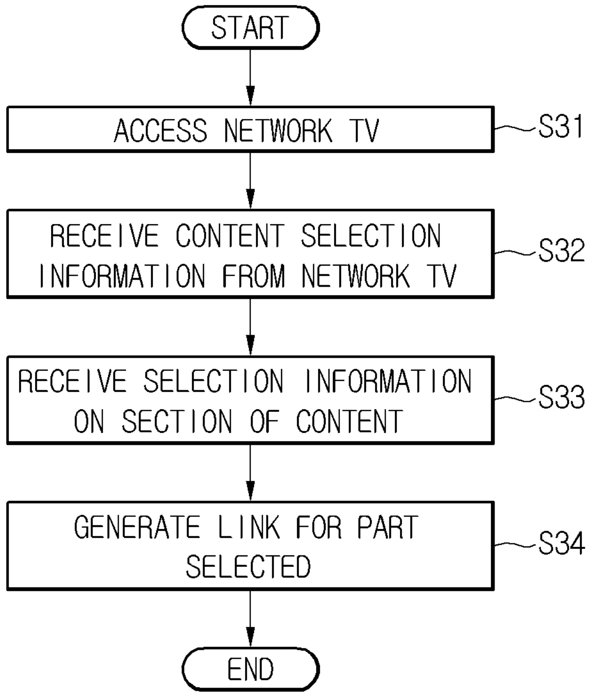
FIG. 16 is a flowchart illustrating a method of being performed in a content provider server among a method where a user generates link information for a section of specific content, according to an embodiment.

FIG. 16 is a flowchart illustrating a method of being performed in the content provider server 20 among a method where a user generates link information for a section of specific content, according to an embodiment.

The content provider server 20 accesses a user terminal, i.e., the network TV 40 in operation S31. The content provider server 20 receives content selection information from the network TV 40 in operation S32. The content provider server 40 receives selection information on a section of the selected content in operation S33. The content provider server 40 generates link information for a part that is selected on the basis of the selection information on the section in operation S34. The generated link information may be transmitted to the network TV 40, or may be stored in it.

In the above-described embodiments, all the sources of content, i.e., the data from a start point to an end point of the content are stored in the content provider server 20, but, depending on the case, the content provider server 20 may create content in real time and transmit the content to the network TV 40. For example, the content provider server 20 may provide content, which is currently being broadcasted in a broadcasting station, to the network TV 40 as streaming. In this case, the user may not select a part of content or may not set a section of the content like the above-described embodiments. However, the user needs generate a link even for content that is created and provided in real time. When the user views a scene of interest, it may generate and store a link for the scene of interest or share with other users.

According to an embodiment, the user may generate and store a link even for real-time content, or may share the link with other users.

Figure 17:
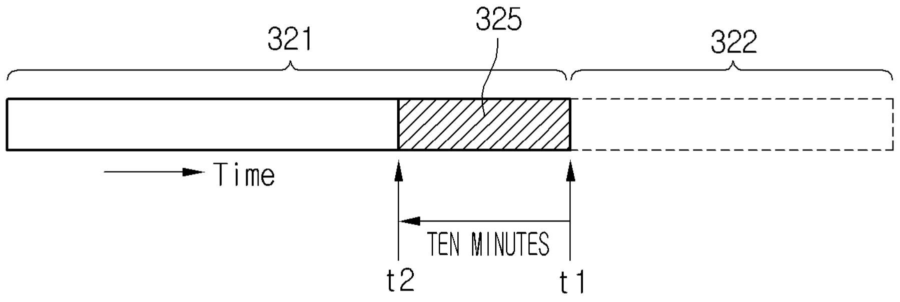
FIG. 17 is an exemplary diagram illustrating a method of designating sections of content which is provided in real time, according to an embodiment.

It is assumed that the content provider server 20 provides real-time content to the network TV 40. At a time t1, when the user pushes a current scene storage button, as illustrated in FIG. 17, the network TV 40 may transmit scene information up to the scene of a time t2 that is backdated by a certain time, for example, about ten minutes, from a time when the user pushes the current scene storage button, to the content provider server 20. The content provider server 20 may generate a link on the basis of scene information received. At this point, the link may be generated after real-time content is completed and transmitted completely, or may be generated in the middle of transmitting of the content. The generated link information may be transmitted to the network TV 40 or stored in the content provider server 20.

When the user pushes the current scene storage button, information on a scene that is displayed in the network TV 40 at the time t1 and a scene that is displayed in the network TV 40 at the time t2 which is backdated by about ten minutes from the time t1 is transmitted to the content provider server 20. At this point, scene information at the times t1 and t2 may be used as time information of the times t1 and t2. For example, the time t1 may be 2:00 P.M., the time t2 may be 1:50 P.M., and the network TV 40 may transmit the time information to the content provider server 20. The content provider server 20 may generate a link for a part of content that is transmitted from the content provider server 20 to the network TV 40 at 2:00 P.M. to 1:50 P.M.

According to embodiments, when content is compressed in a compression scheme such as MPEG2 or MPEG4 and transmitted, scene identification information or I picture information corresponding to a scene displayed at the time t1 and scene identification information or I picture information corresponding to a scene displayed at the time t2 may be transmitted to the content provider server 20. The content provider server 20 may generate a link for a scene at a time when the user pushes the current scene storage button, on the basis of the scene identification information. An I picture may be one that is referenced by a scene displayed at the time t1 or be one closest to the scene displayed at the time t1.

As described above, when providing time information or section information by using the I picture, an accurate scene the user desires may not designated. According to an embodiment, after a link is generated, the user may again access the link and again edit a section of content corresponding to the corresponding link. At this point, similarly to FIG. 9 or 11, a progressive bar is provided, and the user may again set an accurate section it desires with the progressive bar.

Figure 18:
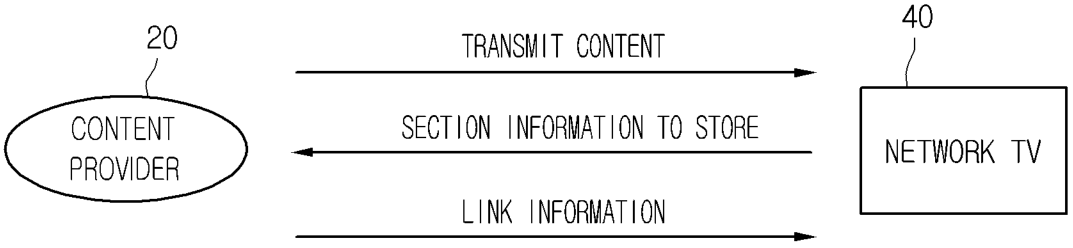
FIGS. 18 and 19 are diagrams illustrating a network configuration for describing a method of generating link for real-time content, according to an embodiment.

FIG. 18 is a diagram illustrating a network configuration for describing a method of generating link for real-time content, according to an embodiment. In FIG. 18, the network operator server 10 and the service provider 30 are omitted.

When section information to store is received from the network TV 40 while the content provider server 20 provides real-time content to the network TV 40, the content provider server 20 may generate a link on the basis of the section information to store and transmit the link to the network TV 40.

The network configuration of FIG. 18 illustrates a case where real-time content is transmitted over a network, but an embodiment may be applied even to real-time broadcasting content that is transmitted over terrestrial broadcasting, a cable or a satellite.

Figure 19:
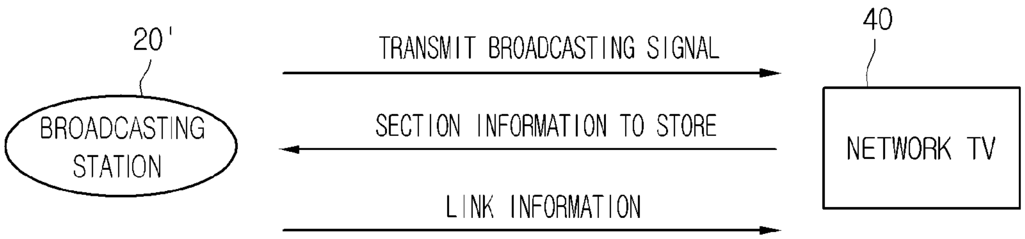

Referring to FIG. 19, when a broadcasting station 20' transmits broadcasting signal content to the network TV 40 over terrestrial broadcasting, a cable or a satellite, the network TV 40 transmits section information for storing to a server that is operated by the broadcasting station 20' or another broadcasting station, and a broadcasting station server may generate a link for a corresponding section to transmit the link to the network TV 40.

Figure 20:
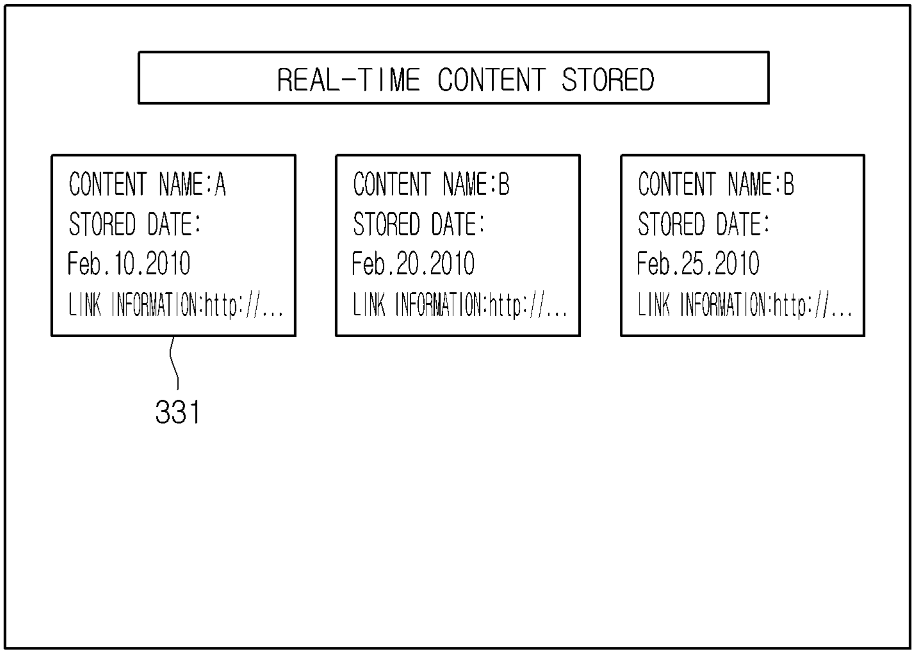
FIG. 20 is an exemplary diagram illustrating a screen on which a link for real-time content is displayed as an icon type, according to an embodiment.

A link for real-time content is generated in the content provider server 20 or the broadcasting station 20', and when information of the link is transmitted to the network TV 40, as illustrated in FIG. 20, each stored link may be displayed as an icon 331. Each icon may include a content name, a stored date and link information, i.e., an URL address. Alternatively, the each icon may include the representative image or thumbnail of content stored.

Figure 21:
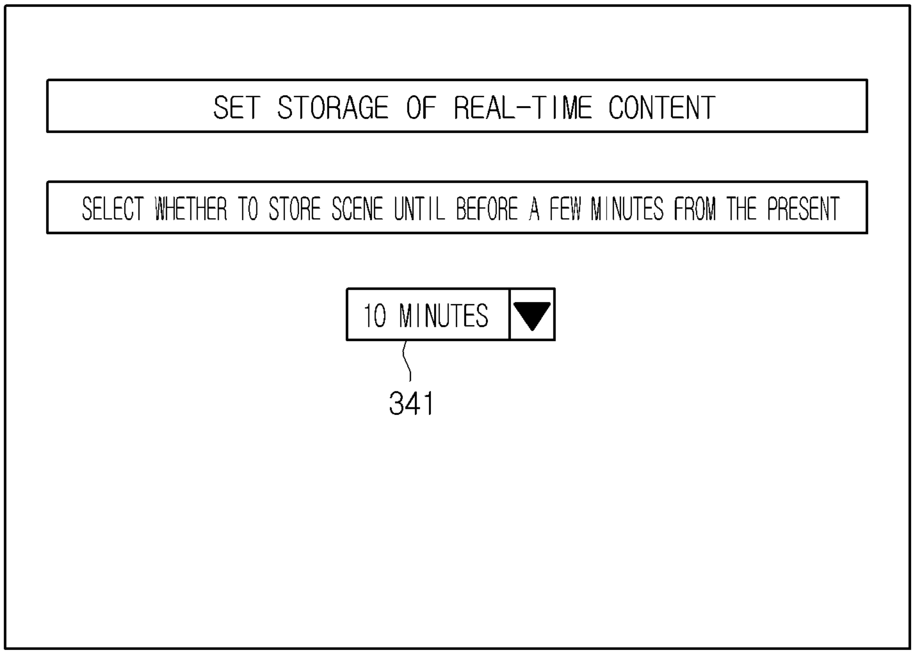
FIG. 21 is an exemplary diagram illustrating a menu for setting time to be backdated when generating a link for real-time content, according to an embodiment.

According to an embodiment, a user may designate the time to be backdated with the menu of FIG. 21. Alternatively, the time to be backdated may be designated by the content provider server 20.

Figure 22:
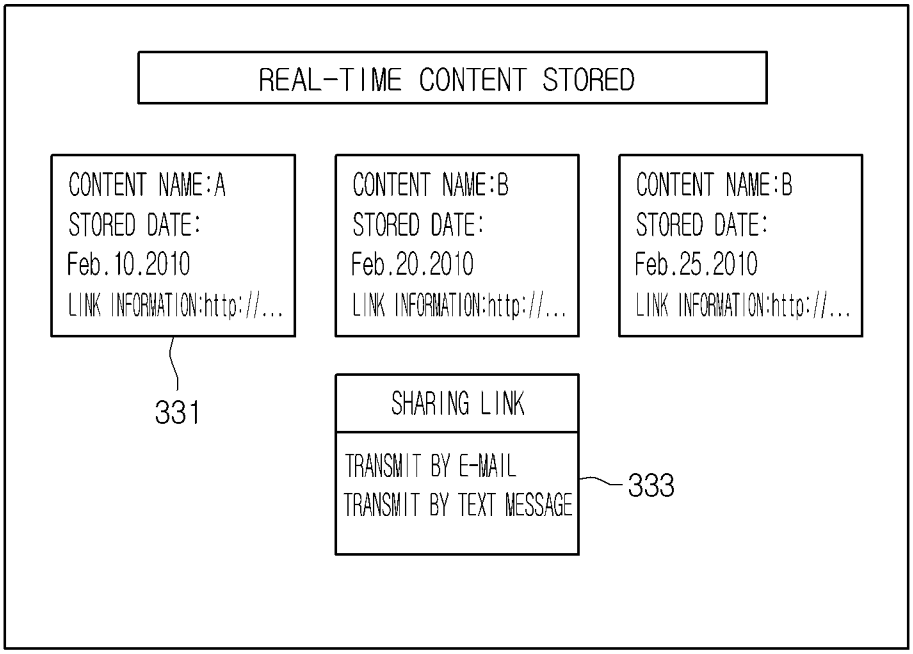
FIG. 22 is an exemplary diagram illustrating a method of sharing link information for real-time content.

The user may share a section of content corresponding to a link with another user by using link information stored in the network TV 40. Referring to FIG. 22, when the user selects one 331 of icons stored in the network TV 40 and selects a menu, a share menu 333 may be displayed. The user may transmit link information by an arbitrary communication system, for example, e-mail or text message. Another user receiving the link information may access the content provider server 20 or the broadcasting station 20' through a link and access content corresponding to the link.

Through such method, the user may easily store content of interest among contents it had viewed and easily share with other users.

Figure 23:
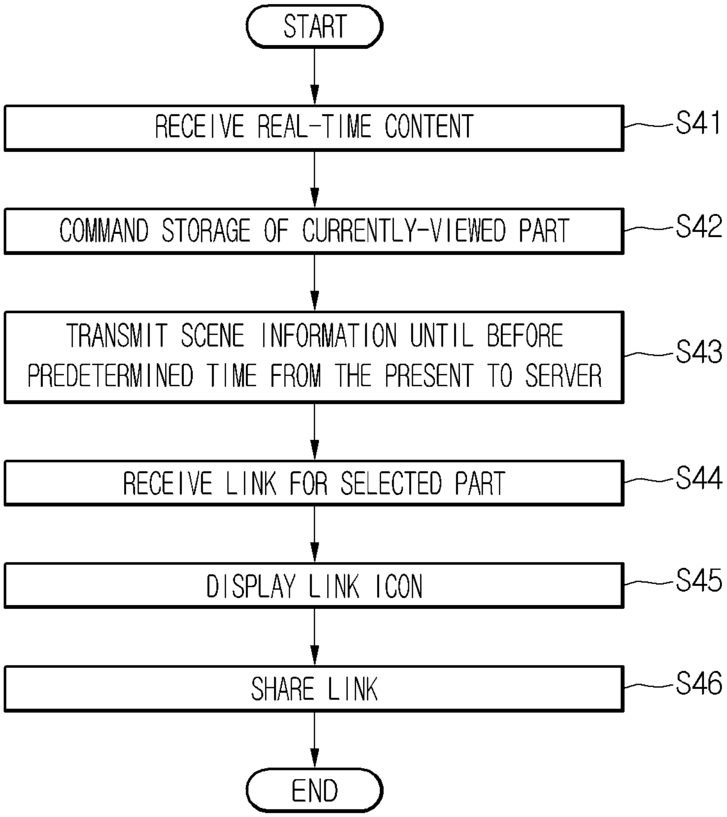
FIG. 23 is a flowchart illustrating a method of generating a link for real-time content in a network TV, according to an embodiment.

FIG. 23 is a flowchart illustrating a method of generating a link for real-time content in a network TV, according to an embodiment.

The network TV 40 receives real-time content from the real-time content provider server 20 or the broadcasting station 20' over a network, terrestrial broadcasting, a cable or a satellite in operation S41.

When a command indicating the storage of a part that a user is viewing currently, i.e., a part that is being replayed currently is inputted in operation S42, the network TV 40 transmits scene information up to a scene, which is backdated by a predetermined time from the present, to a server in operation S43. At this point, as described above, the scene information may be transmitted as a type of time information or be transmitted as I picture information. Also, time to be backdated may be set by the user. The content provider server 20 or the broadcasting station 20' generates a link on the basis of the scene information and transmits the link to the network TV 40.

The network TV 40 receives link information in operation S44, and displays the received link as an icon type in operation S45. The network TV 40 transmits the link information to other users according to the user's command in operation S46.

In the above-described embodiments, the network TV has been described above as an example, but an embodiment may be applied to a user terminal, being an arbitrary video processing device, which may access a network to receive and replay contents.

The network TV 40 may be implemented as a smart TV that may install various applications. By installing applications for performing the above-described functions or a set of computer commands in the smart TV, the functions may be performed in the smart TV. Applications or software for performing the above-described functions may include a plurality of modules for operating the controller of the network TV 40, and each of the modules may include computer-readable codes or commands. Moreover, the applications or software for performing the above-described functions may be stored in arbitrary storage mediums such as Hard Disk Drives (HDDs) and optical recording mediums.

According to embodiments, a user can download a part of one content or receive streaming service for the part, and generate a link for the part to directly access the part or share the part with other users, in the network TV system.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of segmenting and accessing content in a display device accessible to a network, the method comprising:

accessing a content provider server;

receiving a content selection input;

receiving a selection input for a section of selected content;

transmitting information of the selected section to the content provider server;

receiving link information and segmentation information for accessing the selected section from the content provider server;

storing the link information received from the content provider server;

displaying data associated with a section set using the stored link information;

selecting at least one of the stored link information;

selecting a share menu for sharing the selected link information; and transmitting the link information to another device by arbitrary communication, wherein the segmentation information includes time information and price information of the selected section.

2. The method according to claim 1, wherein the data associated with the selected section includes notification indicating that a link for the selected section is generated.

3. The method according to claim 1, wherein the content is segmented into a plurality of sections and provided by the content provider server.

4. The method according to claim 1, further comprising:

displaying a menu, which includes at least one of segmentation information and a preview of the content, to a user.

5. The method according to claim 1, wherein the content is segmented into a plurality of sections by a setting of a user.

6. The method according to claim 5, further comprising:

displaying a progressive bar for setting the sections to the user.

7. The method according to claim 5, further comprising:

displaying at least one of a preview screen, a start screen, and an end screen of the set section to the user.

8. A method of segmenting and accessing content in a display device accessible to a network, the method comprising:

receiving and replaying content;

receiving a storage command of the replayed content;

transmitting scene information up to a time, which is backdated by a certain time from a currently-replayed scene of the replayed content, to a content provider server;

receiving link information for accessing a section corresponding to the scene information from the content provider server, and storing the link information;

generating a link information list including segmentation information of the transmitted scene;

displaying the link information list;

selecting at least one of the stored link information;

selecting a share menu for sharing the selected link information; and transmitting the link information to another device by arbitrary communication, wherein the segmentation information a time information and price information of the selected section.

9. The method according to claim 8, wherein the scene information includes time information of a scene which is backdated by a certain time and the currently-replayed scene.

10. The method according to claim 8, wherein the scene information includes I picture information respectively corresponding to a scene which is backdated by a certain time and the currently-replayed scene.

11. The method according to claim 8, wherein the backdated time is set by a user.

12. A method of segmenting and providing content in a server providing contents over a network, the method comprising:

receiving a storage request to currently-replayed content from a user terminal;

receiving scene information of the content from the user terminal;

generating link information for accessing a section corresponding to the scene information;

storing the link information received from the content provider server;

displaying data associated with the section set using the stored link information;

selecting at least one of the stored link information;

selecting a share menu for sharing the selected link information; and transmitting the link information to another device by arbitrary communication, wherein the segmentation information including a time information and price information of the selected section.

13. The method according to claim 12, wherein the scene information includes received time information of a scene which is backdated by a certain time and a currently-replayed scene.

14. The method according to claim 12, wherein the scene information includes I picture information respectively corresponding to a scene which is backdated by a certain time and a currently-replayed scene.

15. A video signal processing apparatus accessible to a network, the video signal processing apparatus comprising:

a user input unit configured to receive a storage command of currently-replayed content and receive a select command of received link information;

a network interface configured to transmit the storage command to a content provider server, and receive data and segmentation information of the data associated with content from the content provider server;

a controller configured to:

transmit scene information up to a scene, which is backdated by a certain time from a currently-replayed scene of the replayed content, to the content provider server, receive link information for accessing a section corresponding to the scene information from the content provider server to store the link information, when the storage command is received, generate a link information list including segmentation information of the transmitted scene, and transmit the link information to another device by arbitrary communication; and a display configured to display the content and the link information, wherein the segmentation information includes time information and price information of the selected section.

16. The video signal processing apparatus according to claim 15, wherein the scene information includes received time information of a scene which is backdated by a certain time and the currently-replayed scene.

17. The video signal processing apparatus according to claim 15, wherein the scene information includes I picture information respectively corresponding to a scene which is backdated by a certain time and the currently-replayed scene.

18. The video signal processing apparatus according to claim 15, wherein the backdated time is set by a user.

* * * * *